United States Patent
Oblak et al.

(10) Patent No.: US 10,889,958 B2
(45) Date of Patent: *Jan. 12, 2021

(54) DISPLAY SYSTEM FOR MACHINE

(71) Applicant: Caterpillar Inc., Peoria, IL (US)

(72) Inventors: Tod A. Oblak, Pittsburgh, PA (US); Lawrence A. Mianzo, Pittsburgh, PA (US); Jeffrey T. Stringer, Pittsburgh, PA (US)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/614,650

(22) Filed: Jun. 6, 2017

(65) Prior Publication Data

US 2018/0352162 A1 Dec. 6, 2018

(51) Int. Cl.
| | |
|---|---|
| E02F 3/30 | (2006.01) |
| H04N 7/18 | (2006.01) |
| G06K 9/00 | (2006.01) |
| G06K 9/20 | (2006.01) |
| G06K 9/32 | (2006.01) |
| E02F 9/26 | (2006.01) |
| E02F 3/43 | (2006.01) |

(52) U.S. Cl.
CPC ............ *E02F 3/30* (2013.01); *G06K 9/00805* (2013.01); *G06K 9/2081* (2013.01); *G06K 9/3233* (2013.01); *H04N 7/181* (2013.01); *E02F 3/435* (2013.01); *E02F 9/261* (2013.01)

(58) Field of Classification Search
CPC ....... H04N 5/23293; H04N 7/181; E02F 3/30; E02F 9/261; G06K 9/78; G06K 9/00805; G06K 9/2081; G06T 7/11; G06T 2207/30261
See application file for complete search history.

(56) References Cited

U.S. PATENT DOCUMENTS

| | | | |
|---|---|---|---|
| 7,058,228 B2 | 6/2006 | Toyota et al. | |
| 7,136,097 B1 * | 11/2006 | Toyoda | G06T 1/20 348/222.1 |
| 7,664,331 B2 | 2/2010 | Komatsu | |

(Continued)

FOREIGN PATENT DOCUMENTS

| | | |
|---|---|---|
| EP | 1363237 | 8/2005 |
| JP | 2016110648 | 6/2016 |

*Primary Examiner* — Richard A Hansell, Jr.
(74) *Attorney, Agent, or Firm* — Miller, Matthias & Hull LLP

(57) ABSTRACT

A display system for displaying image data of an environment of a machine includes an imaging device. The imaging device generates image data of the environment of the machine. The imaging device stores the image data in an uncompressed form. The imaging device compresses the image data and generates signals indicative of the compressed image data. The display system further includes a display screen communicably coupled to the imaging device. The display screen receives the signals indicative of the compressed image data from the imaging device and displays the compressed image data on the display screen. The imaging device and the display screen identify whether a region of interest exists in the image data. The display screen displays the image data corresponding to the region of interest in the uncompressed form.

23 Claims, 6 Drawing Sheets

(56) References Cited

U.S. PATENT DOCUMENTS

| | | | |
|---|---|---|---|
| 7,796,136 B2* | 9/2010 | Takagi | G06F 3/147 345/547 |
| 8,421,863 B2 | 4/2013 | Ryo et al. | |
| 8,917,292 B2* | 12/2014 | Gotou | B60R 1/00 345/660 |
| 9,218,783 B2 | 12/2015 | Toshiyuki et al. | |
| 2002/0015062 A1* | 2/2002 | Shimazu | B60K 37/02 715/772 |
| 2004/0120591 A1* | 6/2004 | Brower | H04N 19/40 382/240 |
| 2007/0016553 A1* | 1/2007 | Dumais | H04L 51/34 |
| 2008/0079001 A1* | 4/2008 | Umezaki | H01L 27/1251 257/59 |
| 2008/0129844 A1* | 6/2008 | Cusack | H04N 5/232 348/241 |
| 2008/0137923 A1* | 6/2008 | Spahn | A61B 90/36 382/128 |
| 2009/0009308 A1* | 1/2009 | Date | B60R 1/00 340/439 |
| 2009/0303338 A1* | 12/2009 | Chaurasia | H04N 5/2624 348/222.1 |
| 2011/0010631 A1* | 1/2011 | Rothschild | G06F 16/434 715/733 |
| 2011/0135151 A1* | 6/2011 | Jang | H04N 19/17 382/103 |
| 2011/0276652 A1* | 11/2011 | Mukherjee | H04N 19/37 709/217 |
| 2014/0118541 A1* | 5/2014 | Lasko | G08B 13/19682 348/143 |
| 2014/0205139 A1* | 7/2014 | Kriel | G06K 9/00805 382/103 |
| 2014/0300826 A1* | 10/2014 | Funke | H04N 21/42204 348/734 |
| 2014/0320637 A1 | 10/2014 | Yi | |
| 2015/0188889 A1* | 7/2015 | Lawson | H04L 63/0281 726/15 |
| 2016/0217331 A1* | 7/2016 | Kowatari | H04N 7/181 |
| 2016/0366365 A1* | 12/2016 | Iyer | H04N 7/0117 |
| 2018/0349708 A1* | 12/2018 | van Hoof | G08B 13/19656 |

* cited by examiner

DISPLAY SYSTEM FOR MACHINE

TECHNICAL FIELD

The present disclosure relates to a display system for a machine. More specifically, the present disclosure relates to the display system for displaying image data of an environment of the machine.

BACKGROUND

A machine, such as a hydraulic excavator, is a self-propelled construction machine designed for conducting work, such as excavating. The hydraulic excavator may include an upper swiveling body installed on a base having a crawler or wheel carriage. A self-propelled working machine, such as the hydraulic excavator, may be provided with a surveillance mechanism for surveying around the upper swiveling body in order to ensure the safety for working and to improve the operability of the machine is known. This surveillance mechanism may be constituted by one or more cameras attached to the upper swiveling body and a display screen installed at a position in front of an operator's seat at an operator station. Images taken by the camera may be displayed on the display screen.

In order to maximize safety while operating the machine, the plurality of cameras may be configured to obtain a widest possible viewing angle around the working machine. The cameras may generate image data corresponding to the surround view and communicate those images to the display. In some instances it may be desirable to compress the image data before communicating it over a data link of the machine due to system design requirements. Compressing the image data may reduce image quality and may affect an ability of the operator to verify the identity of an object being shown on the display screen. An alternative solution is to install a higher capacity data link for transmission of image data, but this would not be possible because the speed of the Ethernet Links are limited due to system design requirements.

E.P. Patent No. 1,363,237 (hereinafter referred to as '237 reference) describes an image processing system for transforming an original image corresponding to a physical format of a display by using a deformation function. The '237 reference includes a method for detecting the original image with multiple pixels, and determining a main region in the image that is to be displayed without deformation, and one or more adjacent regions that can be displayed with deformation. However, the '237 reference does not disclose details about any solution for reduction in the image quality with deformation.

Therefore, an improved display system for displaying image data of the environment of the machine is required.

SUMMARY

In an aspect of the present disclosure, a display system for displaying image data of an environment of a machine is provided. The display system includes an imaging device which generates image data of the environment of the machine. The imaging device compresses the image data and generates signals indicative of the compressed image data. The imaging device is communicably coupled to a display screen. The display screen receives the signals indicative of the compressed image data from the imaging device and displays the compressed image data on the display screen. The display screen identifies whether the displayed image data includes a region of interest. The imaging device and the display screen identify whether a region of interest exists in the image data. The display screen displays the image data corresponding to the region of interest in the uncompressed form.

In another aspect of the present disclosure, a method of displaying image data of an environment of a machine is disclosed. The method includes generating the image data of the environment of the machine by an imaging device. The method further includes storing the image data in an uncompressed form by the imaging device. The method includes compressing the image by the imaging device. The method further includes generating signals indicative of the compressed image data by the imaging device. The method includes receiving the signals indicative of the compressed image data by a display screen. The method further includes displaying the compressed image data on the display screen. The method includes identifying whether a region of interest exists in the image data by the imaging device and the display screen. The method includes displaying the image data corresponding to the region of interest in the uncompressed form by the display screen.

In yet another aspect of the present disclosure, a machine including an imaging device is disclosed. The imaging device generates image data of an environment of the machine. The imaging device stores image data in the uncompressed form. The imaging device compresses the image data and generates signals indicative of the compressed image data. The machine further includes a display system having a display screen communicably coupled to the imaging device. The display screen receives the signals indicative of the compressed image data from the imaging device and displays the compressed image data on the display screen. The imaging device and the display screen further identify whether a region of interest exits in the image data. The display screen then displays the image data corresponding to the region of interest in the uncompressed form.

DETAILED DESCRIPTION

Figure 1:
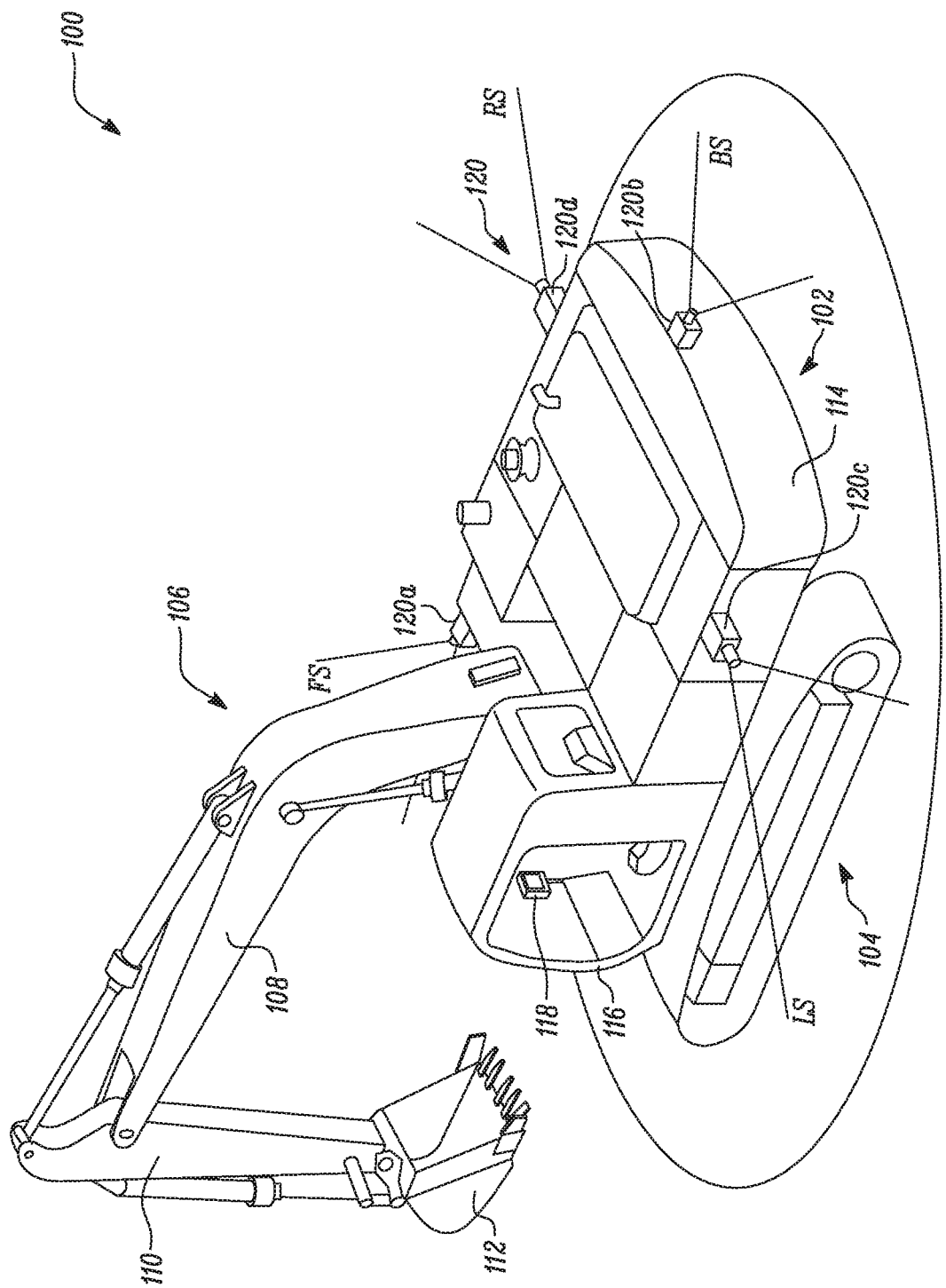
FIG. 1 is a perspective view of a machine having a display system, in accordance with an embodiment of the present disclosure.

Wherever possible, the same reference numbers will be used throughout the drawings to refer to same or like parts. FIG. 1 shows an exemplary machine 100. The machine 100 is illustrated as a hydraulic excavator which may be used, for example, for construction and other allied industries. While the following detailed description describes an exemplary aspect in connection with the hydraulic excavator, it should be appreciated that the description applies equally to the use of the present disclosure in other machines as well.

The machine 100 includes an upper swiveling body 102 supported on a ground engaging element 104. Although, the ground engaging element 104 is illustrated as continuous tracks here, it should be contemplated that the ground engaging element 104 may be any other type of ground engaging element as well, such as, for example, wheels etc. The machine 100 further includes a working mechanism 106 for conducting work, such as, for example, to excavate landsides or otherwise move material. The working mechanism 106 is an excavating mechanism including a boom 108, an arm 110, and a bucket 112, which serves as a front attachment. Additionally, the upper swiveling body 102 includes a counterweight 114 provided at a tail end.

Further referring to FIG. 1, the machine 100 includes an operator station 116 coupled to the upper swiveling body 102. The operator station 116 includes a display screen 118 and other levers or controls (not shown) for operating the machine 100. The machine 100 further includes an imaging device 120 for generating image data (not shown). The imaging device 120 includes a plurality of imaging devices 120 for generating the image data, the plurality of imaging devices 120 positioned at spaced locations on the machine 100 so as to capture images of varying regions around the machine 100.

In the illustrated embodiment, the plurality of imaging devices 120 include a first imaging device 120a, a second imaging device 120b, a third imaging device 120c, and a fourth imaging device 120d mounted on the upper swiveling body 102. The first imaging device 120a, the second imaging device 120b, the third imaging device 120c, and the fourth imaging device 120d may be referred to together as the imaging devices 120. In an embodiment, each of the plurality of imaging devices 120 may include cameras capable of capturing both still and moving images. In an embodiment, the imaging devices 120 may each include smart cameras or smart vision systems having a dedicated processor onboard, including video processing acceleration provided by Field programmable Gate array (FPGA), digital signal processor (DSP), general purpose graphics processing unit (GP-GPU), or any other suitable microprocessor with supporting application software.

In the illustrated embodiment, the first imaging device 120a is installed adjacent the boom 108 and obtains images of a front side FS of an environment E of the machine 100. The second imaging device 120b is installed at a position substantially in the middle of the counterweight 114 and covers a back side BS of the upper swiveling body 102. Moreover, the third imaging device 120c is installed at a position behind the operator station 116 and upon the upper swiveling body 102 for obtaining images of a left side LS, and the fourth imaging device 120d is installed on a position opposite to the third imaging device 120c on the upper swiveling body 102 for obtaining images of a right side RS of the environment E of the machine 100. With the provision of the first imaging device 120a, the second imaging device 120b, the third imaging device 120c, and the fourth imaging device 120d, a view of substantially all sides around the machine 100 is generated. In an embodiment, the imaging devices 120 may generate a view of the environment E of the machine 100 which is blocked or obstructed, such as, for example, a rear-view image of the environment E of the machine 100 may be displayed on the display screen 118.

Figure 2:
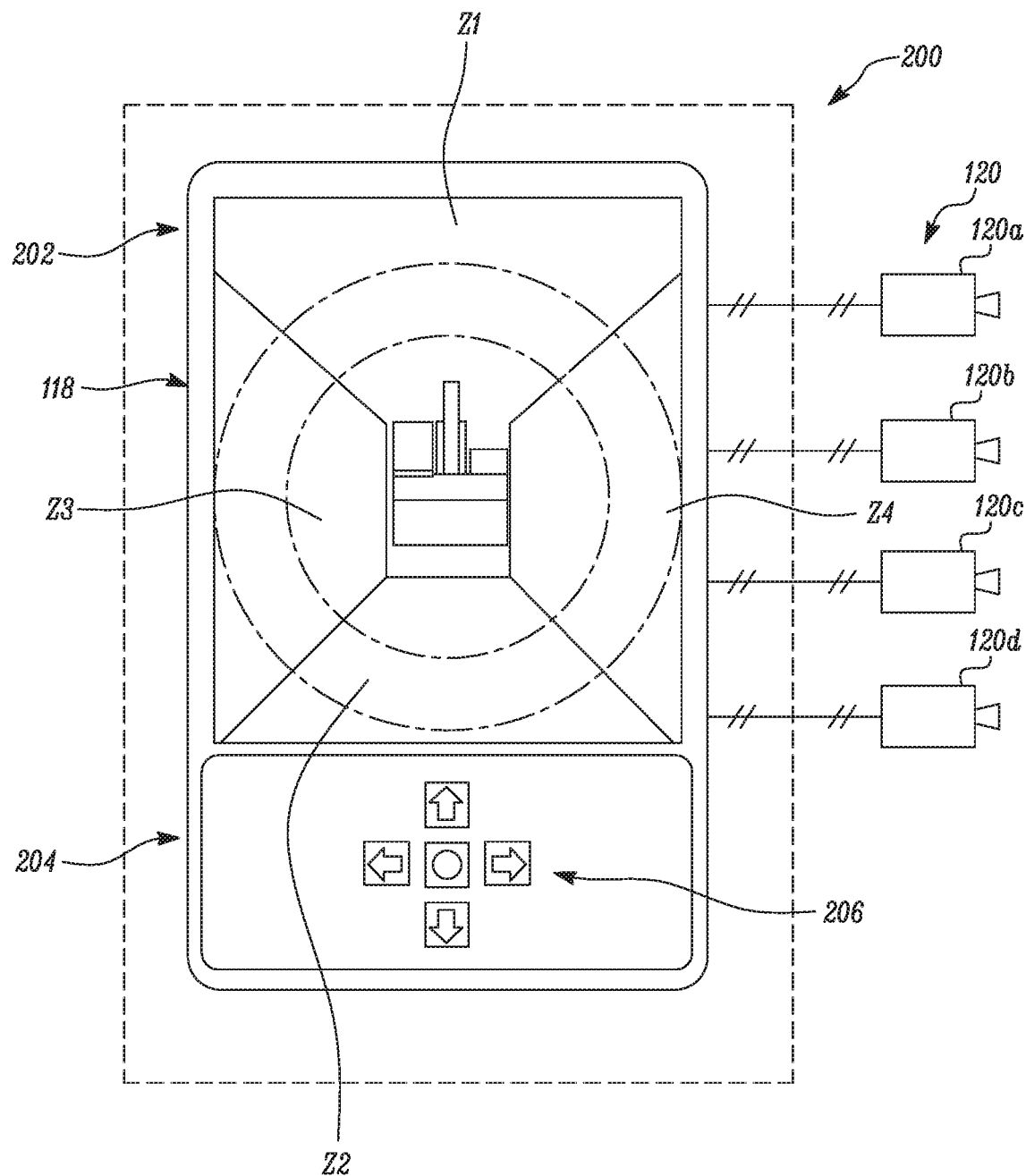
FIG. 2 is a schematic representation of the display system of the machine, in accordance with an embodiment of the present disclosure.

Now referring to FIG. 2, a display system 200 is illustrated. The display system 200 includes the display screen 118. The display screen 118 includes a display section 202 and a control section 204. The display section 202 is capable of displaying digital images and can be controlled, via manual controllers 206 of the control section 204 via touchscreen control of the display section 202, or via a combination of manual and touchscreen controllers. The display screen 118 is communicably coupled to the plurality of imaging devices 120. In an embodiment, the display screen 118 is communicably coupled to the imaging devices 120 for receiving the respective image data.

In the illustrated embodiment, the display section 202 is divided in a first zone Z1, a second zone Z2, a third zone Z3, and a fourth zone Z4. The first zone Z1 displays a first image data (not shown) generated as a first signal (not shown) from the first imaging device 120a. Similarly, the second zone Z2, the third zone Z3, and the fourth zone Z4 display a second image data (not shown), a third image data (not shown), and a fourth image data (not shown) received from the second imaging device 120b, the third imaging device 120c, and the fourth imaging device 120d, respectively. The first image data, the second image data, the third image data, and the fourth image data are stored in an uncompressed form by the respective imaging devices. In an embodiment, the uncompressed form of the image data refers to a highest possible resolution of the image data which may be generated by the imaging device 120. The first image data, the second image data, the third image data, and the fourth image data are compressed by the respective imaging devices before communicating to the display screen 118. In an embodiment, the first imaging device 120a, the second imaging device 120b, the third imaging device 120c, and the fourth imaging device 120d may generate and communicate the first image data, the second image data, the third image data, and the fourth image data, respectively, to the first zone Z1, the second zone Z2, the third zone Z3, and the fourth zone Z4 of the display screen 118 for generating a surround-view image of the environment E of the machine 100. In an embodiment, the display screen 118 may generate only an image of the environment E of the machine 100 which is blocked or obstructed. In an embodiment, the rear-view image of the environment E of the machine 100 may be displayed on the display screen 118.

Figure 3:
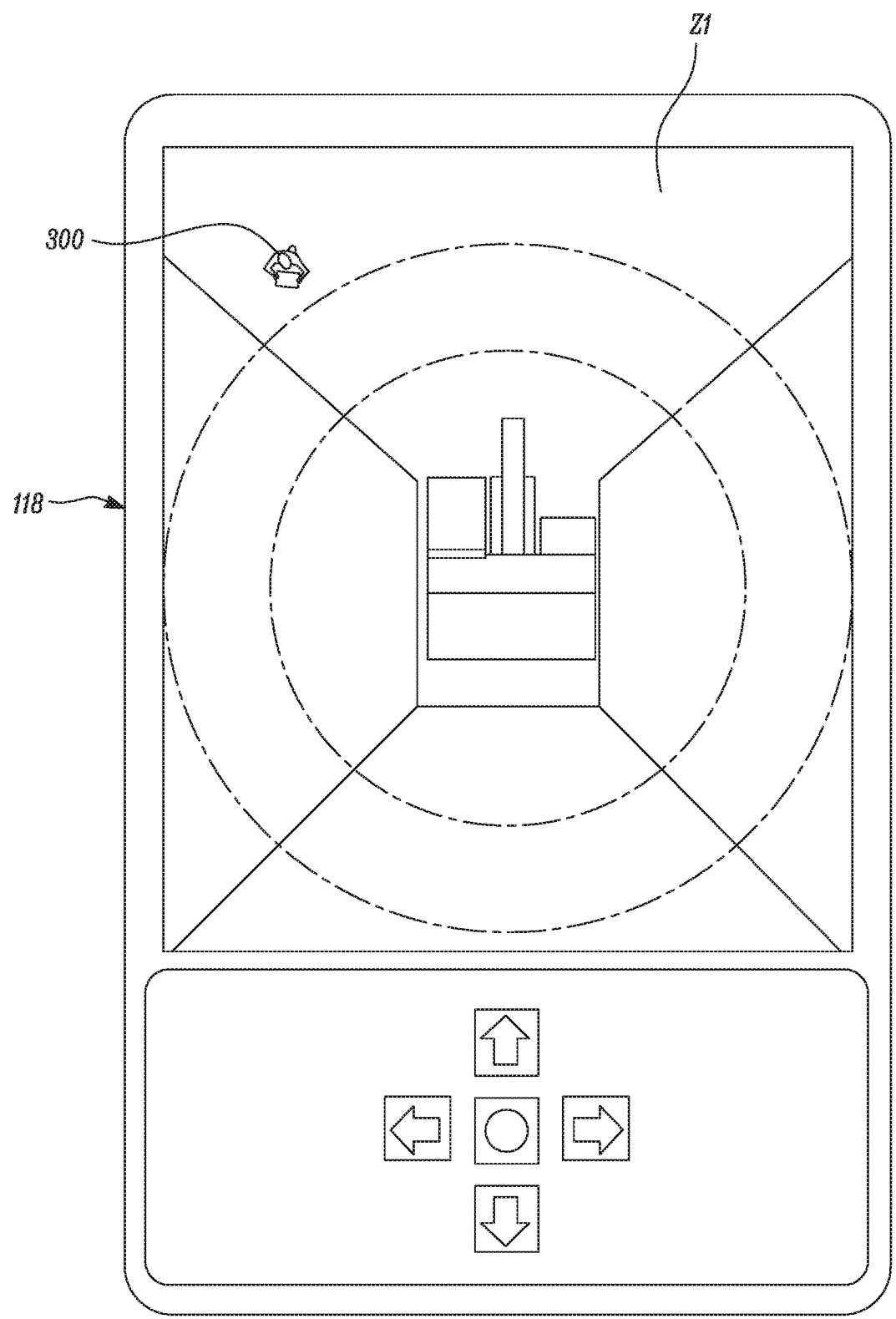
FIG. 3 is a front perspective view of a display screen of the display system of the machine, in accordance with an embodiment of the present disclosure.

As shown in FIG. 3, the display screen 118 shows the respective compressed image data being displayed in the respective zones. The compressed first image data is displayed in the first zone Z1. As seen in the figure, an object 300 is displayed in the first zone Z1. Although, the object 300 may be visible, it may not be clear enough to an operator (not shown) because the compressed first image data of the first zone Z1 is of reduced quality. It must be noted that the first imaging device 120a may compress the first image data by using various systems and algorithms known in the art and the application of present disclosure does not depend on a manner of compression of the plurality of sub-images.

Figure 4:
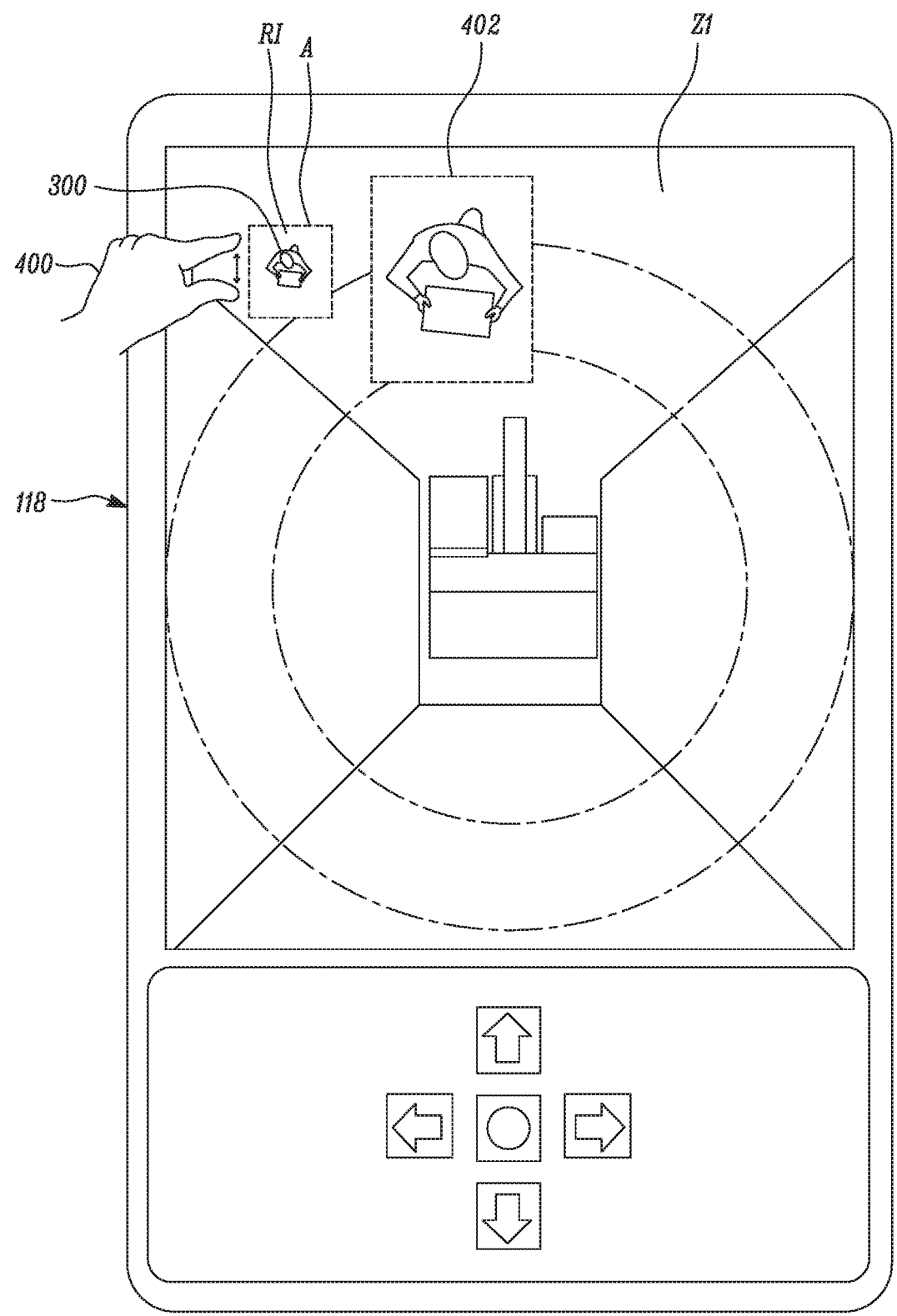
FIG. 4 is a front view showing a first configuration of the display screen of the display system of the machine, in accordance with an embodiment of the present disclosure.

FIG. 4 shows the display screen 118 in a first configuration. In this first configuration, the first zone Z1 includes the object 300 of the first image data. The first zone Z1 also shows an area A selected on the display screen 118 by a hand 400 of a user (not shown), that is, a user input 400. The selected area A defines a region of interest RI. The region of interest RI may include a plurality of region of interests RI spread across same or various zones. In another embodiment, the plurality of region of interests RI includes an associated priority rank (not shown) for each region of interest RI. The associated priority rank may be defined by a variety of parameters. The parameters may include the size of the corresponding region of interests RI, or an operator input for selecting prioritized region of interest RI. Prioritization may also be performed automatically by the personnel detection algorithm. The personnel detection algorithm may assign a score to each of the region of interests RI, and then use the assigned scores to prioritize the region of interests RI.

On receiving the user input 400 at the display screen 118, the display screen 118 may send a signal to request the first imaging device 120*a* to provide the image data corresponding to the region of interest RI in an uncompressed form. In an embodiment, the first imaging device 120*a* may automatically identify the region of interest RI. The first imaging device 120*a* may then send image data corresponding to the region of interest RI to the display screen 118 without compressing. This may ensure that image data belonging to the region of interest RI or the object 300, is displayed in comparatively higher quality than the compressed first image data. In an embodiment, where the compressed image data is sent in a lower resolution than the highest possible resolution of the imaging devices 120 due to the system design requirements, the image data belonging to the region of interest RI or the object 300 may be displayed in the highest possible resolution of the imaging devices 120. The image data belonging to the region of interest RI is displayed as a first pop-up image 402 on the display screen 118, as shown in the illustrated embodiment. In an embodiment, the image data belonging to the region of interest RI may be displayed in an overlay manner near the location of the region of interest RI in the compressed image data. Other manners as suitable for the present disclosure may be contemplated for displaying the image data belonging to the region of interest RI. In an embodiment where the plurality of region of interests RI are being considered, the associated priority ranks may be used to prioritize the image data before sending to the display screen 118.

Figure 5:
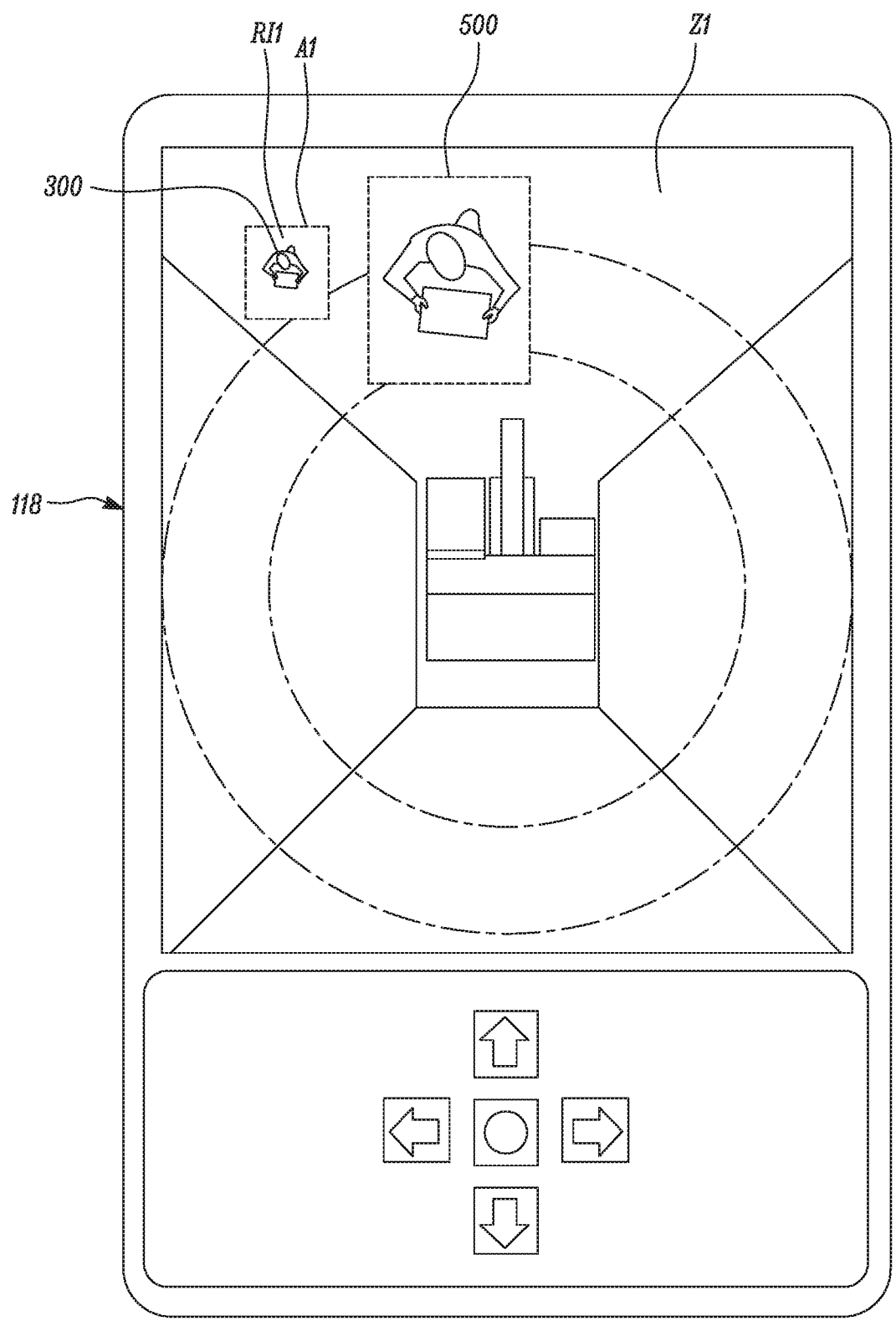
FIG. 5 is a front view showing a second configuration of the display screen of the display system of the machine, in accordance with an embodiment of the present disclosure.

In an embodiment shown in FIG. 5, a second configuration of the display screen 118 is depicted. In this second configuration, a first region of interest RI1 is automatically identified by the first imaging device 120*a* or the display screen 118, based upon an object detection technology or algorithm used in the art. The first imaging device 120*a* or the display screen 118 may select the first region of interest RI1 based upon detection of a person in a region. Similar to the first configuration of FIG. 4, the image data belonging to the first region of interest RI1 is sent without any compression by the first imaging device 120*a* to the display screen 118, and displayed as a second pop-up image 500 showing a selected area µl. In contrast, the object 300 may be of reduced quality and is displayed accordingly. In an embodiment, the first region of interest RI1, and thereby the second pop-up image 500 may be plural in numbers.

With combined reference to FIGS. 1-5, the first imaging device 120*a* generates the first image data having the object 300. The first imaging device 120*a* stores the generated first image data in the uncompressed form. The first imaging device 120*a* simultaneously compresses the generated first image data. The first imaging device 120*a* further generates the first signal indicative of the compressed first image data. Although, the above description includes only the first imaging device 120*a* and its parameters, a combination of various imaging devices greater or smaller in number should be contemplated in similar manner. The first imaging device 120*a* sends the compressed first image data to the display screen 118 over a data link (not shown) of the machine 100. In an embodiment where the plurality of region of interests RI are being considered, the associated priority rank may be used to prioritize the data before sending to the display screen 118.

The display screen 118 receives the signals indicative of the compressed first image data from the first imaging device 120*a* and displays the compressed first image data. The first imaging device 120*a* or the display screen 118 then identify whether a region of interest RI exists in the generated image data. In an embodiment, the first imaging device 120*a* or the display screen 118, utilize the object detection technology or algorithms used in the art for detection. In an embodiment, the object detection technology or algorithms may include any technique of identifying objects in the captured image data. If the first imaging device 120*a* identifies the region of interest RI, the first imaging device 120*a* sends the image data of the region of interest RI to the display screen 118 in the uncompressed form. If the display screen 118 identifies the region of interest RI, the display screen 118 further sends the signal to request the image data of the region of interest RI from the first imaging device 120*a* in the uncompressed form. The display screen 118 displays the first pop-up image 402 corresponding to the region of interest RI and having uncompressed image data, in comparatively higher quality.

INDUSTRIAL APPLICABILITY

Figure 6:
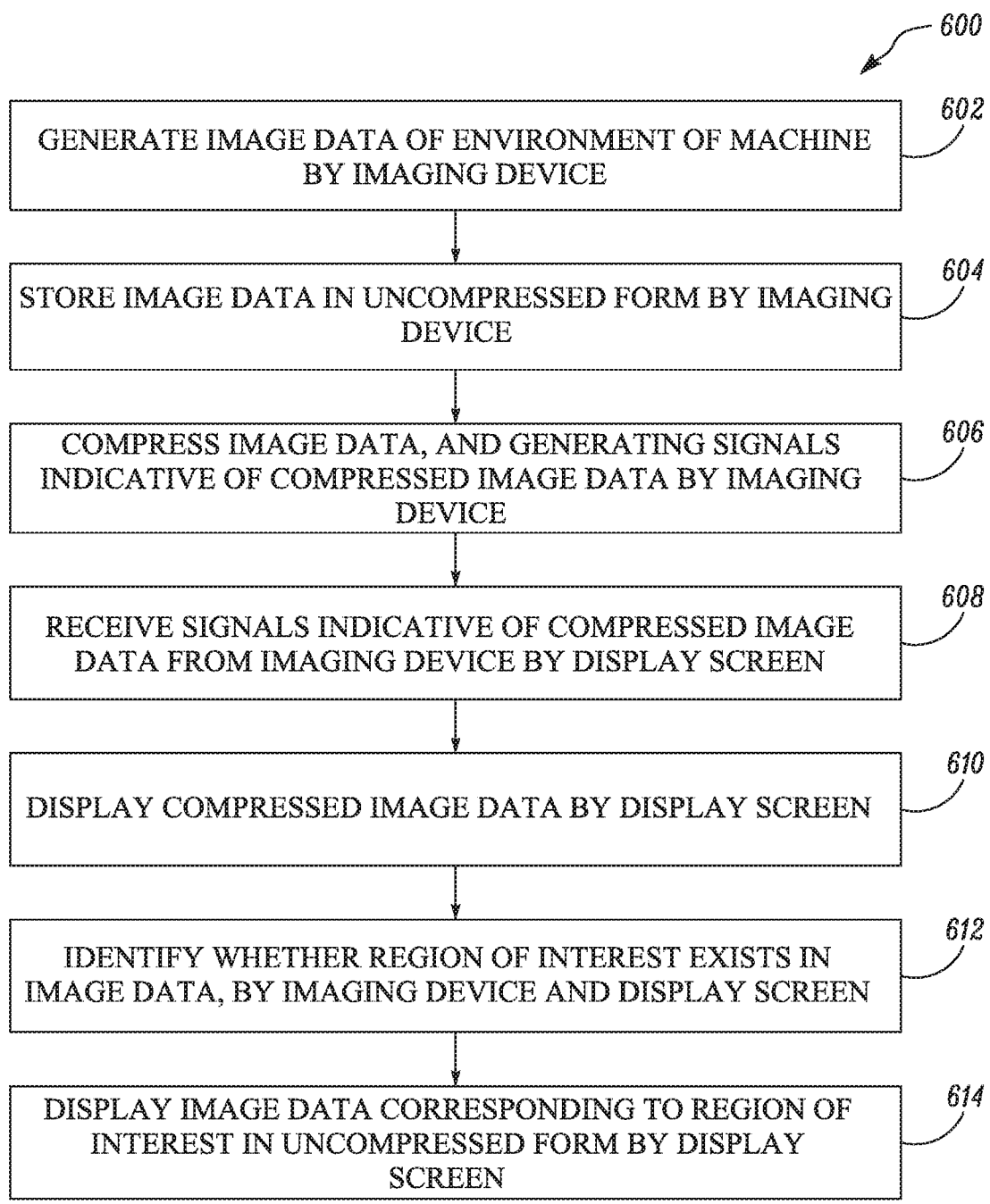
FIG. 6 is a flow chart depicting a method of displaying image data of an environment of the machine, in accordance with an embodiment of the present disclosure.

The present disclosure provides a method of displaying the image data of the environment E of the machine 100. A method 600 for displaying the image data is illustrated with the help of FIG. 6. In an embodiment, the machine 100 is switched on and is operating to excavate.

The method 600 at step 602 includes generating the image data of the environment E of the machine 100 by the imaging device 120. The method 600 at step 604 includes storing the image data in an uncompressed form. The method 600 at step 606 includes compressing the image data by the imaging device 120. Selectively displaying the plurality of region of interests RI in an uncompressed form on the display screen 118 enables the machine 100 to work efficiently while also adhering to the system design requirements. The method 600 at step 606 further includes generating the signals indicative of the compressed image data by the imaging device 120.

The method 600 at step 608 includes receiving the signals indicative of the compressed image data from the imaging device 120 by the display screen 118. The method 600 at step 610 includes displaying the compressed image data on the display screen 118 in reduced quality. The method 600 at step 612 includes identifying whether the region of interest RI exists in the image data by the imaging device 120 and the display screen 118. The identification of the region of interest RI enables better clarification on the object 300 or similar objects poorly visible to the operator. This ensures increased operational safety while saving valuable operating cost by reducing any break-down time needed by the operator to clarify the object 300.

The method 600 at step 614 includes displaying the image data corresponding to the region of interest RI in the uncompressed form. This enables the user to verify whether the object 300 detected by the object detection technology of the imaging device 120 or the display screen 118, is in reality a person or an object or a false alarm. Additionally, the method 600 may include sending the image data corresponding to the region of interest RI in the uncompressed form to the display screen 118, if the region of interest is automatically identified by the imaging device 120. Similarly, the method 600 may include sending the image data corresponding to the region of interest RI in the uncompressed form to the display screen 118, if the region of interest is automatically identified by the display screen 118.

In an embodiment, the method 600 may include selecting the region of interest RI by the user input 402. The user input 402 may be defined by the selection of the area A on the display screen 118. Similarly, the method 600 may include deselecting the region of interest RI by the user input 402. In case of a false alarm etc., the user may deselect the region of interest RI. The user input 402 in this case may be defined by a tap or touch over the selected area A or outside the selected area A. In an embodiment, the method 600 may include automatically identifying the region of interest RI on the automatic detection of the object 300 by the object detection technology.

The method 600 may also include associating the priority rank to the plurality of regions of interests RI. The method 600 may further include defining the priority rank based on various parameters. The parameters may include the size of the corresponding region of interests RI, or an operator input for selecting prioritized region of interest RI. Prioritization may also be performed automatically by the personnel detection algorithm. The personnel detection algorithm may assign a score to each of the region of interests RI, and then use the assigned scores to prioritize the region of interests RI. Prioritizing the region of interests RI according to the priority rank improves communication by facilitating smooth data transmission over the existing data link with limited bandwidth. This may prove beneficial for retrofitting in older machines without need of a substantial investment for replacements.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A display system for displaying image data of an environment of a machine, the display system comprising:
   an imaging device configured to:
      generate image data of the environment of the machine;
      store the image data in an uncompressed form; and
      compress the image data, and generate signals containing the compressed image data;
   a display screen communicably coupled to the imaging device, the display screen configured to:
      receive the signals containing the compressed image data from the imaging device; and
      display the compressed image data on the display screen;
   wherein at least one of the imaging device and the display screen is configured to identify a region of interest in the image data of the environment of the machine;
   wherein the imaging device is configured to transmit uncompressed image data for the identified region of interest to the display screen when the region of interest is identified by at least one of the imaging device and the display screen; and
   wherein the display screen displays the uncompressed image data corresponding to the identified region of interest in an overlay manner on the compressed image data on the display screen.

2. The display system of claim 1, wherein the imaging device sends the uncompressed image data corresponding to the region of interest to the display screen when the region of interest is identified by the imaging device, and the display screen displays the uncompressed image data corresponding to the region of interest in an overlay manner on the compressed image data on the display screen.

3. The display system of claim 1, wherein the display screen sends a signal to request the uncompressed image data of the region of interest from the imaging device when the region of interest is identified by the display screen, and displays the uncompressed image data corresponding to the region of interest in an overlay manner on the compressed image data on the display screen.

4. The display system of claim 1, wherein the region of interest is identified by a user input.

5. The display system of claim 4, wherein the user input comprises selecting an area on the display screen.

6. The display system of claim 1, wherein the region of interest is identified by an automatic detection of an object in the displayed image data using the display screen.

7. The display system of claim 6, wherein the region of interest comprises a plurality of regions of interest having an associated priority rank for each region of interest.

8. A method of displaying image data of an environment of a machine, the method comprising:
   generating, by an imaging device, the image data of the environment of the machine;
   storing, by the imaging device, the image data in an uncompressed form;
   compressing the image data, by the imaging device, and generating signals containing the compressed image data;
   receiving, by a display screen, the signals containing the compressed image data from the imaging device;
   displaying, by the display screen, the compressed image data;
   identifying, by one of the imaging device and the display screen, a region of interest in the image data of the environment of the machine;
   transmitting, by the imaging device, uncompressed image data for the identified region of interest to the display screen when the region of interest is identified by at least one of the imaging device and the display screen; and
   displaying, by the display screen, the uncompressed image data corresponding to the region of interest in an overlay manner on the compressed image data on the display screen.

9. The method of claim 8, wherein the imaging device sends the uncompressed image data corresponding to the region of interest to the display screen when the region of interest is identified by the imaging device, and the display screen displays the uncompressed image data corresponding to the region of interest in an overlay manner on the compressed image data on the display screen.

10. The method of claim 8, wherein the display screen sends a signal to request the uncompressed image data of the region of interest from the imaging device when the region of interest is identified by the display screen, and displays the uncompressed image data corresponding to the region of interest in an overlay manner on the compressed image data on the display screen.

11. The method of claim 8, wherein the method further comprises:
    identifying the region of interest by a user input.

12. The method of claim 11, wherein the method further comprises:
defining user input by selecting an area on the display screen.

13. The method of claim 8, wherein the method further comprises:
identifying the region of interest, by the display screen, by automatically detecting an object in the displayed image data.

14. The method of claim 8, wherein the method further comprises:
associating, by the imaging device, a priority rank to a plurality of regions of interests.

15. A machine comprising:
an imaging device configured to:
generate image data of an environment of the machine;
store the image data in an uncompressed form; and
compress the image data, and generate signals containing the compressed image data;
a display system communicably coupled to the imaging device, the display system including:
a display screen configured to:
receive the signals containing the compressed image data from the imaging device; and
display the compressed image data;
wherein at least one of the imaging device and the display screen is configured to identify a region of interest in the image data of the environment of the machine;
wherein the imaging device is configured to transmit uncompressed image data for the identified region of interest to the display screen when the region of interest is identified by at least one of the imaging device and the display screen; and
wherein the display screen displays the uncompressed image data corresponding to the identified region of interest in an overlay manner on the compressed image data on the display screen.

16. The machine of claim 15, wherein the imaging device sends the uncompressed image data corresponding to the region of interest to the display screen when the region of interest is identified by the imaging device, and the display screen displays the uncompressed image data corresponding to the region of interest an overlay manner on the compressed image data on the display screen.

17. The machine of claim 15, wherein the display screen sends a signal to request the uncompressed image data of the region of interest from the imaging device, and displays the uncompressed image data corresponding to the region of interest in an overlay manner on the compressed image data on the display screen.

18. The machine of claim 15, wherein the region of interest is identified by a user input.

19. The machine of claim 16, wherein the user input comprises selecting an area on the display screen.

20. The machine of claim 15, wherein the region of interest is identified by an automatic detection of an object in the displayed image data using the display screen.

21. The display system of claim 1, wherein uncompressed image data is transmitted from the imaging device to the display screen only after the region of interest is identified.

22. The method of claim 8, comprising transmitting uncompressed image data from the imaging device to the display screen only after identifying the region of interest.

23. The machine of claim 15, wherein uncompressed image data is transmitted from the imaging device to the display screen only after the region of interest is identified.

* * * * *